United States Patent
Kyle et al.

(10) Patent No.: US 12,499,694 B2
(45) Date of Patent: Dec. 16, 2025

(54) SYSTEMS AND METHODS FOR DETERMINING A SANITIZATION STATUS OF AN ENVIRONMENT

(71) Applicant: Toyota Motor North America, Inc., Plano, TX (US)

(72) Inventors: Roger A. Kyle, Frisco, TX (US); Christopher Risberg, Flower Mound, TX (US); Nikhil Rajendra, Plano, TX (US); Timothy Wang, Frisco, TX (US); Jordan Frank, Farmers Branch, TX (US); Jiju Thomas, Allen, TX (US); David M. Goemer, Frisco, TX (US); Evan Vijithakumara, Frisco, TX (US); Imad Zahid, Carrollton, TX (US); Lizbeth Jurado, El Paso, TX (US); Lou Pope, Flower Mound, TX (US); Yuho Kozu, Dallas, TX (US)

(73) Assignee: Toyota Motor North America, Inc., Plano, TX (US)

( * ) Notice: Subject to any disclaimer, the term of this patent is extended or adjusted under 35 U.S.C. 154(b) by 638 days.

(21) Appl. No.: 17/235,745

(22) Filed: Apr. 20, 2021

(65) Prior Publication Data
US 2022/0335247 A1 Oct. 20, 2022

(51) Int. Cl.
G06V 20/59 (2022.01)
A61L 2/10 (2006.01)
H04W 84/18 (2009.01)

(52) U.S. Cl.
CPC .............. *G06V 20/593* (2022.01); *A61L 2/10* (2013.01); *H04W 84/18* (2013.01)

(58) Field of Classification Search
CPC .... H04W 40/24; H04W 84/18; H04L 45/021; H04L 45/028; H04L 12/28; Y02D 30/70;
(Continued)

(56) References Cited

U.S. PATENT DOCUMENTS

2006/0237254 A1* 10/2006 Mobley ................ B60K 28/063
340/576
2010/0135262 A1* 6/2010 Park ...................... H04W 40/24
370/337
(Continued)

FOREIGN PATENT DOCUMENTS

EP 1209026 A2 5/2002
EP 3355147 A1 8/2018
(Continued)

OTHER PUBLICATIONS

McGrath, et al., "Environmental Monitoring for Health and Wellness" Sensor Technologies. 2013, Apress, Berkeley, CA. https://doi.org/10.1007/978-1-4302-6014-1_11.
(Continued)

*Primary Examiner* — Cindy Trandai
(74) *Attorney, Agent, or Firm* — Dinsmore & Shohl LLP (57) ABSTRACT

A system for determining a sanitization status of an environment includes a plurality of sensors integrated into a surface of the environment, wherein each sensor of the plurality of sensors senses the sanitization status of the surface around the respective sensor, provides data related to the sanitization status, and provides output regarding the sanitization status, a computing device that stores logic that, when executed by the computing device causes the computing device to perform at least: receive the data related to the sanitization status from each of the plurality of sensors; determine at least one unsanitized zone on the surface from the data; and communicate data related to the at least one unsanitized zone to the plurality of sensors such that the plurality of sensors may provide the output regarding the at least one unsanitized zone.

10 Claims, 4 Drawing Sheets

(58) Field of Classification Search
CPC .......... A61L 2/084; A61L 2/0052; A61L 2/24;
A61L 9/18; A61L 2/0047; A61L 2/10;
A61L 2/28; A61L 9/20; A61L 12/063;
A61L 2202/11; A61L 2202/14; A61L
2202/25; A61L 2209/111; A61L 2209/12;
G01N 31/226; H05B 47/115; Y02B
20/40; G06V 20/593
See application file for complete search history.

(56) References Cited

U.S. PATENT DOCUMENTS

| | | | |
|---|---|---|---|
| 2020/0254132 A1 | 8/2020 | Lee | |
| 2021/0306425 A1* | 9/2021 | Baugh | G05B 17/02 |
| 2022/0188716 A1* | 6/2022 | Mathieu | G16H 15/00 |

FOREIGN PATENT DOCUMENTS

| | | |
|---|---|---|
| IN | 202011015845 A | 8/2020 |
| IN | 202011045821 A | 11/2020 |
| JP | 2007089951 A | 4/2007 |

OTHER PUBLICATIONS

Stoppa, et al., "Wearable Electronics and Smart Textiles: A Critical Review" Sensors 2014, https://doi.org/10.3390/s140711957.

* cited by examiner

SYSTEMS AND METHODS FOR DETERMINING A SANITIZATION STATUS OF AN ENVIRONMENT

TECHNICAL FIELD

The present specification generally relates to systems and methods for determining a sanitization status, and, more specifically, to systems and methods for determining a sanitization status of an environment.

BACKGROUND

Users of vehicles may desire a clean and safe environment in the vehicle(s) they use. Vehicles may be used (i.e., occupied) from time to time by various unrelated users and users may not be capable of monitoring or policing the sanitization levels of a cabin for all vehicles in which they may operate or occupy space. This may result in a user not knowing the sanitization status of a vehicle in which he or she may ride, which may make users of vehicles uncomfortable and less likely to use or occupy a given vehicle. Accordingly, in order to promote safe and sanitized ridership in vehicles, a need exists for systems and methods for determining the sanitization status of a vehicle.

SUMMARY

In one embodiment, a system for determining a sanitization status of an environment includes a plurality of sensors integrated into a surface of the environment, wherein each sensor of the plurality of sensors senses the sanitization status of the surface around the respective sensor, provides data related to the sanitization status, and provides output regarding the sanitization status, a computing device that stores logic that, when executed by the computing device causes the computing device to perform at least: receive the data related to the sanitization status from each of the plurality of sensors; determine at least one unsanitized zone on the surface from the data; and communicate data related to the at least one unsanitized zone to the plurality of sensors such that the plurality of sensors may provide the output regarding the at least one unsanitized zone.

In another embodiment, a mesh sensor system for determining a sanitization status of an environment includes a plurality of sensors integrated into a surface of the environment, wherein each sensor of the plurality of sensors senses the sanitization status of the surface around the respective sensor, provides data related to the sanitization status, and provides output regarding the sanitization status; and an electronic control unit configured to: determine a sanitization status of a first sensor of the plurality of sensors; determine a sanitization status of a second sensor of the plurality of sensors; and compare the sanitization status of the first sensor and the sanitization status of the second sensor to determine the sanitization status of the environment.

In yet another embodiment, a method for determining the sanitization status of an environment that includes a plurality of sensors integrated into a surface of the environment, wherein each sensor of the plurality of sensors senses the sanitization status of the surface around the respective sensor, provides data related to the sanitization status, and provides output regarding the sanitization status, the method includes receiving the data related to the sanitization status from each of the plurality of sensors; determining at least one unsanitized zone on the surface from the data; and communicating data related to the at least one unsanitized zone to the plurality of sensors such that the plurality of sensors may provide the output regarding the at least one unsanitized zone.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
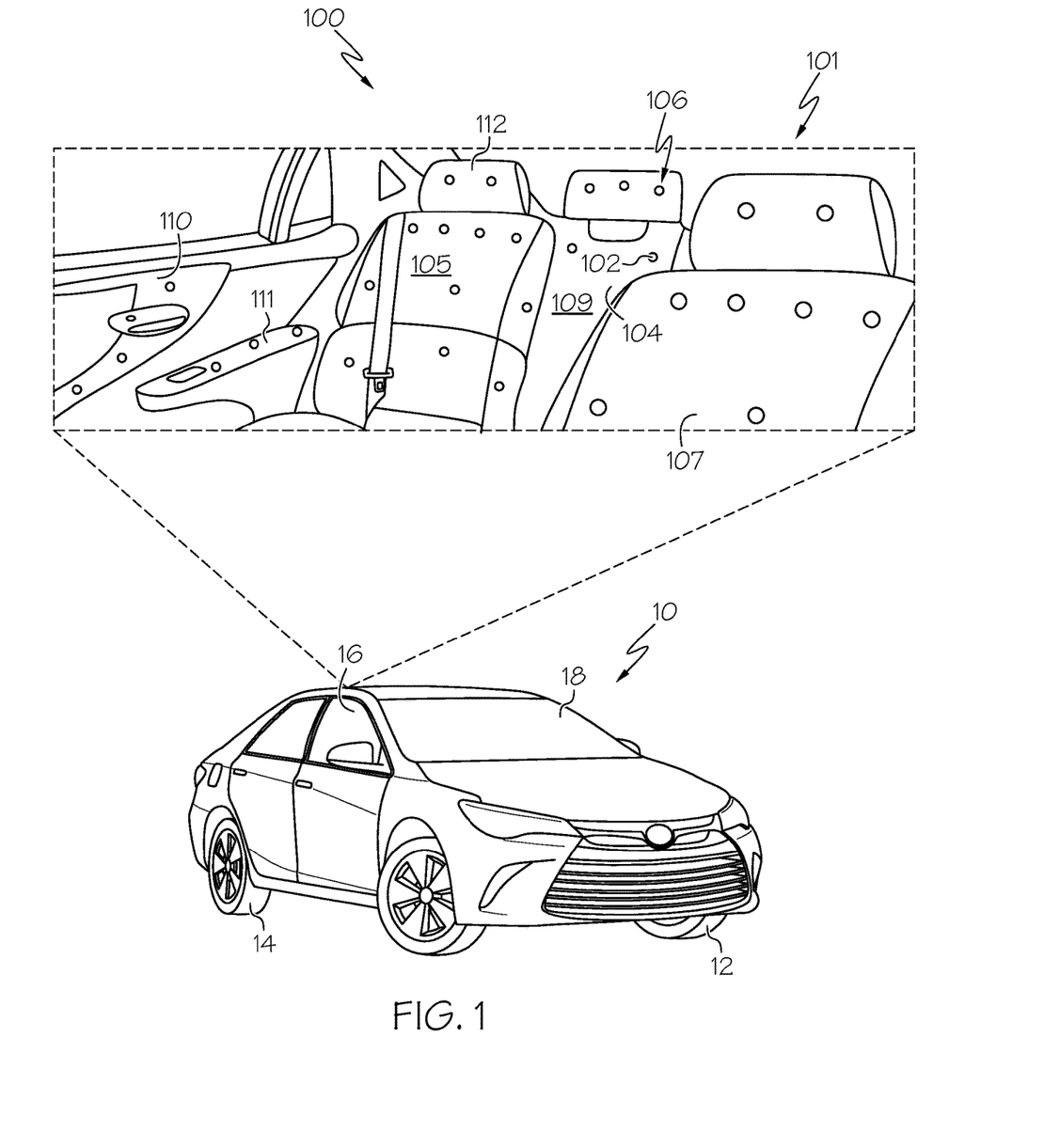
FIG. 1 depicts a vehicle including an environment including a system for determining the sanitization status of the environment, according to one or more embodiments shown and described herein.

FIG. 1 generally depicts a vehicle including a system for determining a sanitization status of an environment inside the vehicle. The system includes a plurality of sensors integrated into a surface of the cabin of the vehicle such as in a mesh sensor network. Each sensor of the plurality of sensors may sense a sanitization status of the surface around the respective sensor and may provide feedback regarding the sanitization status. The system may further include a computing device that stores logic that, when executed by the computing device causes the computing device to receive data related to the sanitization status from each of the plurality of sensors, determine one or more unsanitized zones on the surface, and communicate data related to the one or more unsanitized zone to the plurality of sensors such that the plurality of sensors may provide the feedback regarding the sanitization status.

Referring now specifically to FIG. 1, a vehicle 10 is shown. The vehicle includes front wheels 12, rear wheels 14, windows 16, and a windshield 18. Within the cabin of the vehicle 10 is a system 100 for determining a sanitization status of the cabin 101 of the vehicle 10. The system 100 includes a plurality of sensors 102 integrated into a surface 104 of the cabin 101 of the vehicle 10. Depending on the particular embodiment, the sensors may communicate directly to the system 100 (FIG. 2) and/or may be configured as a mesh sensor network 106. One or more of the plurality of sensors 102 may sense a sanitization status of the surface 104 and/or area around the sensor 102 and may provide feedback regarding the sanitization status of that area.

The plurality of sensors 102 may be integrated into the surface 104 of the cabin of the vehicle 10. For example, the plurality of sensors 102 may be integrated into a fabric, textile, or other covering of one or more vehicle areas such as rear seat 105, front seat 107, armrest 108, a door panel 110, a headrest 112, etc. The integration of the sensors 102 may be such that the sensors 102 are disposed within, on top of, or under the covering. Depending on the particular embodiment, the sensors may be sewn to the covering and/or adhered via an adhesive. The sensors 102 may be connected, for example, using one or more wires (e.g., copper wire), optical threads, or other transmission lines between the sensors. In other embodiments, the plurality of sensors 102 may be connected wirelessly. In some embodiments, one or more of the plurality of sensors 102 may connected wirelessly and one or more of the plurality of sensors 102 may be connected via wires or transmission lines. In some embodiments, one or more of the plurality of sensors 102 may be communicatively coupled via a partial or a full mesh network connected by, for example, one or more wireless connections, wired connections, or via other connection means, in which the sensor 102 is embedded. The mesh sensor network 106 may use a flooding or routing technique to relay information. Accordingly, one or more of the plurality of sensors 102 may send and receive signals, data, and other information in between the one or more of the plurality of sensors 102. One or more of the plurality of sensors 102 may connect directly, dynamically, and non-hierarchically to as many other of the sensors 102 as possible and they may cooperate with one another to efficiently route data from/to one or more clients. One or more of the plurality of sensors 102 may be independent of the other sensors 102 and every of the sensors 102 may participate in the relay of information. In some embodiments, at least a portion of the plurality of sensors 102 may be connected via one or more metamaterial textiles or other smart textiles, which may be connected via, for example, radio surface plasmons propagating on a surface of the metamaterial textiles). Other examples of smart textiles include textiles with flexible embedded transmission lines (e.g., flexible optical fibers, liquid metal conduction, etc.).

In some embodiments, each of the plurality of sensors 102 may include a fuel cell sensor, an infrared (IR) sensor, or other type of sensor capable of detecting a sanitization status of the surface around the sensor and providing feedback regarding the sanitization status. Systems with one or more fuel cell sensors may use, for example, microbial fuel cell-based biosensors. The plurality of sensors 102 may detect, for example, one or more of bacteria, cleansing solutions, etc. The plurality of sensors 102 may comprise one or more biological recognition elements and physical transducers translating the biologic response into an electrical, thermal, or optical signal. Exemplary biosensors may include, for example, one or more immunosensors, enzymatic biosensors, DNA biosensors, cell-based biosensors, and biomimetic biosensors. The fuel cell sensors may be, for example, microbial fuel cells in which microorganisms may function as biocatalysts that consume oxidizable organic materials including chemical energy to generate an electrical signal.

At least a portion of the plurality of sensors 102 may also include an output device to provide output regarding the sanitization status of the area around those sensors. As an example, some embodiments may be configured with a light emitting diode (LED), such that a green visual indicator is provided when the area around a sensor is sanitized and a red visual indicator is provided when the area around the sensor is unsanitized. When the plurality of sensors 102 include such an output device, a visual indication of a sanitization zone may be provided.

The surface 104 may be any sort of material suitable for upholstery in a vehicle. For example, the surface 104 may be leather, faux leather, cloth, or other upholstery. It is to be understood that the materials, fabrics, and sensor networks described herein could be applied in other industries and applications, for example, in aerospace, restaurants, and hotels.

Figure 2:
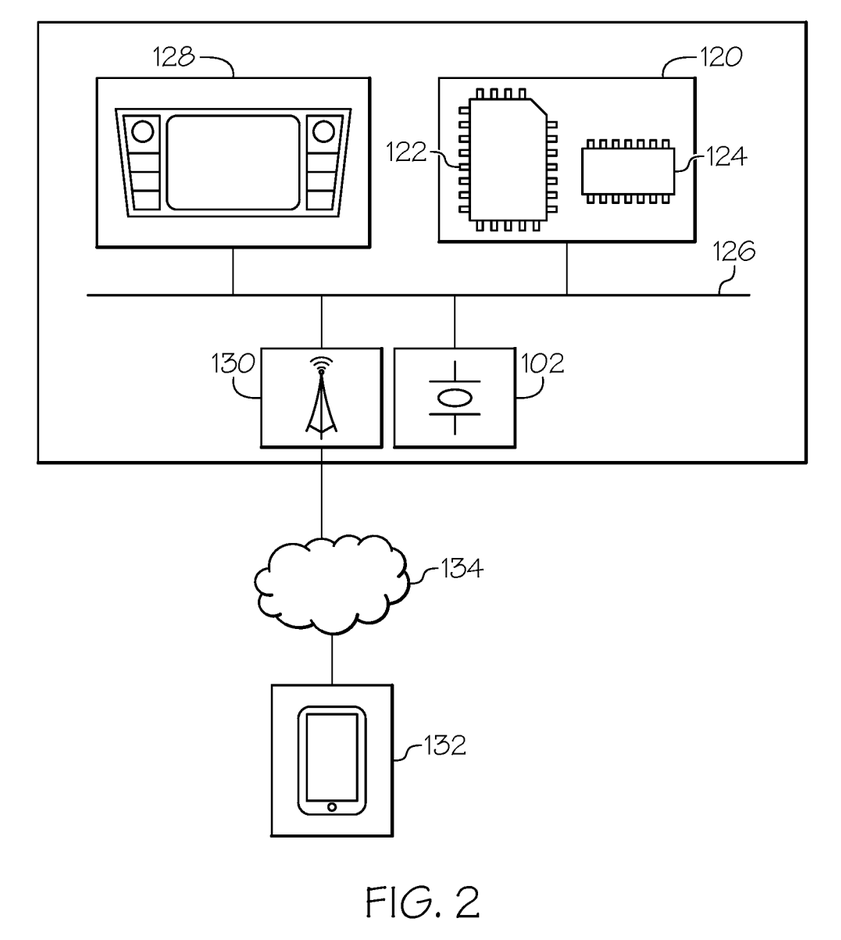
FIG. 2 depicts a schematic diagram of the system for determining the sanitization status of the environment of FIG. 1, according to one or more embodiments shown and described herein.

Referring now to FIG. 2, and with reference to the vehicle 10 illustrated in FIG. 1, a schematic diagram of the system 100 for determining a sanitization status of the vehicle 10 is depicted. While the system 100 is depicted in isolation, the system 100 may be included within the vehicle 10 of FIG. 1. Without limiting the present disclosure, reference to the operation of the system 100 may be made to the system 100 operating and communicating with the plurality of sensors 102, however, operation is equally applicable to other embodiments.

The system 100 includes a controller 120 including one or more processors 122 and one or more memory modules 124. Each of the one or more processors 122 may be any device capable of executing machine readable and executable instructions. Accordingly, each of the one or more processors 122 may include an integrated circuit, a microchip, a computer, or any other computing device or component. The one or more processors 122 may be coupled to a communication path 126 that provides signal interconnectivity between various modules of the system 100. Accordingly, the communication path 126 may communicatively couple any number of processors 122 with one another, and allow the modules coupled to the communication path 126 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As noted above, the system 100 includes one or more memory modules 124 coupled to the communication path 126. The one or more memory modules 124 may comprise RAM, ROM, flash memories, hard drives, or any device capable of storing machine readable and executable instructions such that the machine readable and executable instructions can be accessed by the one or more processors 122. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 124. In some embodiments, machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Accordingly, the communication path 126 may be formed from any medium that is capable of transmitting a signal such as, for example, conductive wires, conductive traces, optical waveguides, or the like. In some embodiments, the communication path 126 may facilitate the transmission of wireless signals, such as WiFi, Bluetooth®, Near Field Communication (NFC) and the like. Moreover, the communication path 126 may be formed from a combination of mediums capable of transmitting signals. In one embodiment, the communication path 126 comprises a combination of conductive traces, conductive wires, connectors, and buses that cooperate to permit the transmission of electrical data signals to components such as processors, memories, sensors, input devices, output devices, and communication devices. Accordingly, the communication path 126 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

In some embodiments, the system 100 may include a user control device 128 coupled to the communication path 126. The user control device 128 may include one or more interfaces for manually operating various functions and/or components of the system 100. The one or more interfaces of the user control device 128 may include, for example, hard buttons, knobs, touch screens with soft buttons, or the like. As such, the user control device 128 may be included or incorporated into a display device (e.g., a heads-up display).

In embodiments, the system 100 includes network interface hardware 130 for communicatively coupling the system 100 to a remote device 132 such as, for example, a mobile device, via a network 134. The network interface hardware 130 can be communicatively coupled to the communication path 126 and can be any device capable of receiving and transmitting data via the network 134. Accordingly, the network interface hardware 130 can include a communication transceiver for sending and/or receiving any wired or wireless communication. For example, the network interface hardware 130 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 130 includes hardware configured to operate in accordance with the Bluetooth® wireless communication protocol. One or more of the network interface hardware 130 and the remote device 132 may be communicatively coupled to or include a global positioning system (GPS) used to locate one or more components of the system 100.

Figure 3:
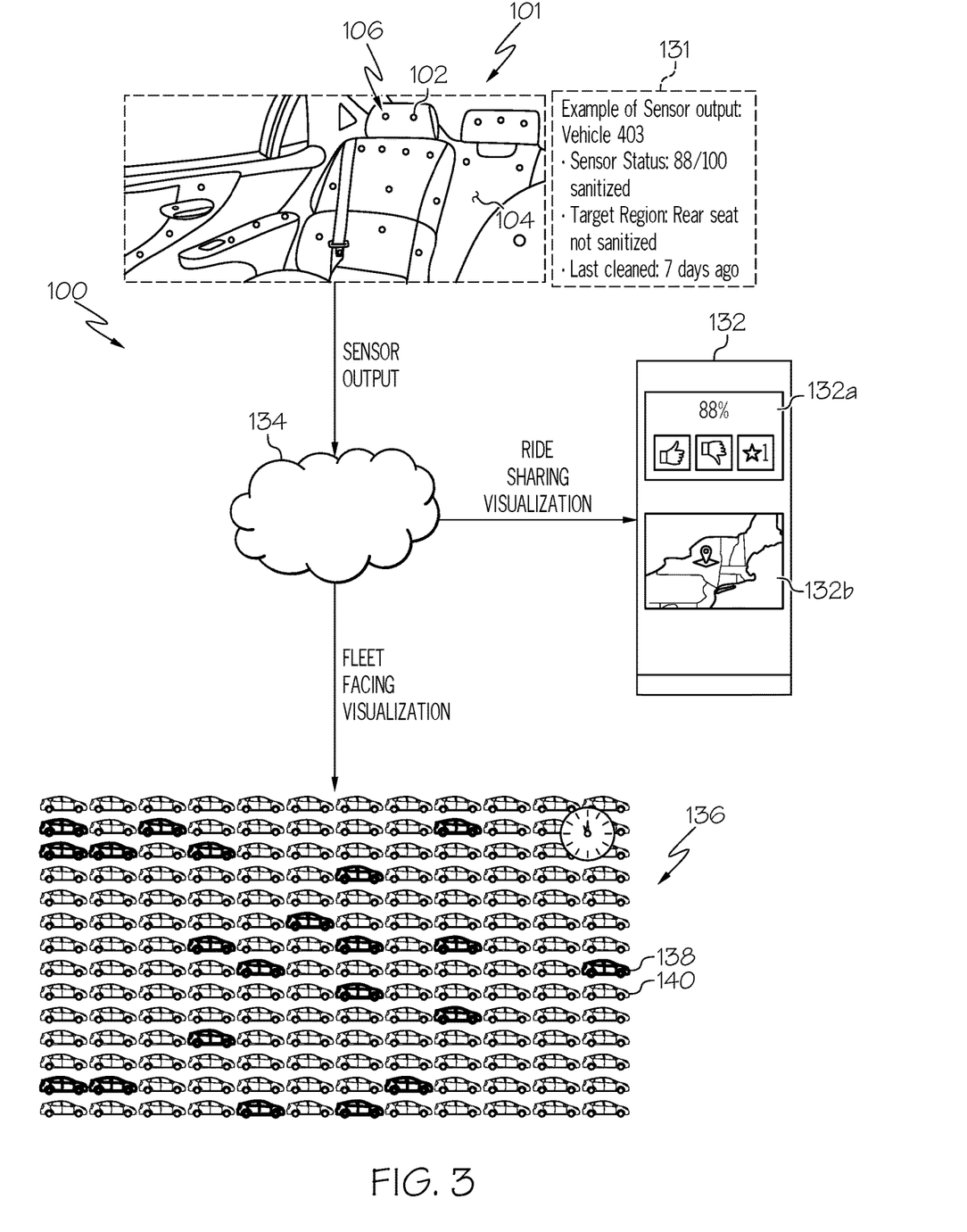
FIG. 3 depicts a network for reporting the status of the environment of FIG. 1 to a user of a car-sharing network, according to one or more embodiments shown and described herein.

Referring now to FIG. 3, an implementation of an embodiment of the system 100 of FIGS. 1 and 2 for selecting a particular vehicle based on a cleanliness status of a cabin of the particular vehicle is shown. FIG. 3 depicts the cabin 101 of the vehicle 10 of FIG. 1 including the system 100 including the plurality of sensors 102 in the surface 104. The system 100 is connected to the remote device 132 and a fleet-facing visualization 136 via the network 134.

In some embodiments, the remote device 132 may include a display (e.g., a touchscreen display) and may provide a graphical user interface including a vehicle information section 132a and a vehicle location section 132b. The vehicle information section may 132a include information about the sanitization status of the vehicle 10. For example, the vehicle information section 132a may indicate the average sanitization status of the vehicle 10, which may be calculated, for example, by calculating the number of sanitized or unsanitized sensors in the vehicle 10. The number of sanitized or unsanitized sensors may be expressed, for example, as a percentage of the total number of sensors. For example, the vehicle depicted in FIG. 3 shows that 88 out of 100 total sensors return a sanitized status. A user may use the vehicle information section 132a as a quick reference, for example, when selecting a ride share vehicle from a pool of ride share vehicles, when determining which vehicle needs to be sanitized and which portions of a vehicle need to be sanitized, or for other purposes that require information regarding the sanitization status of a region or area of the vehicle 10. For example, in some embodiments the vehicle information section 132a may instruct, depict, or otherwise inform a user of the particular regions of the vehicle 10 that need to be cleaned (e.g., "back right seat requires cleaning") as determined based on a status of the various sensors.

The vehicle information section 132a may further include one or more options with which a user can provide feedback to the system. For example, a user may "like" or "dislike" a cleanliness percentage displayed at the vehicle information section 132a in order to provide feedback regarding the cleanliness of the cabin 101. In one non-limiting example, if the cleanliness percentage displayed is 100% but it is clear to a user that the cabin 101 of the vehicle 10 is not clean, he or she may use the "dislike" button to provide feedback to the system 100 that it is apparently sensing something incorrectly. Such information can be used by the system 100 to learn how often it may need cleaning or which areas of the vehicle 10 may require more frequent cleaning. Such information may further be used to determine, for example, the accuracy of the sensors of the system, individual and aggregate information about user preferences, such as which particular users prefer which level of cleanliness, which users prefer particular areas of the vehicle to be clean, etc. Such information may be used, for example, to make recommendations to a user of a vehicle about which areas of the vehicle to particularly clean; to make recommendations to a user of a car sharing service (e.g., a user borrowing a vehicle) of which vehicle to borrow, which areas of a particular vehicle to occupy (e.g., back-left seat, etc.); or other useful information.

The vehicle location section 132b may display information, such as, for example, the location of one or more vehicles based on the cleanliness status of the particular vehicle. For example, the user may filter for all vehicles with a cleanliness status of greater than or equal to 50% and the vehicle location section 132b may show the location of all vehicles meeting such criteria. Such feature may be used, for example, to locate vehicles that are clean, disinfected, etc. and/or to locate vehicles that require cleaning, disinfecting, etc. It is to be understood that the particularly depicted sections are not limiting and may not be implemented in all embodiments of the system 100 for determining the sanitization status of a vehicle. Some embodiments may be configured to identify the number of passengers and match those passengers with a vehicle that includes at least that number of sanitized seats.

Still referring to FIG. 3, the remote device 132 or other display may be used to display a fleet-facing visualization 136 for visualizing an entire vehicle fleet based on cleanliness levels of the particular vehicles. The fleet-facing visualization in FIG. 3 depicts two types of vehicles: sanitized vehicles 140 and unsanitized vehicles 138. The fleet-facing visualization 136 may provide a user of the system 100 more details regarding individual vehicles in the fleet. For example, a user may select one or more individual vehicles in the fleet-facing visualization 136 to obtain more information about the individual vehicle. For example, a user may select (e.g., by touching an icon on a touch screen) one of the unsanitized vehicles 138. The user may be presented information via an interface 142 (e.g., using the remote device 132) such as a vehicle serial number (e.g., "Vehicle 403"), an indication of the number of sanitized sensors within the vehicle (e.g., as a fraction of the total number of sanitized sensors), a target region information (e.g., information regarding regions of the vehicle which have not been sanitized), a date, time, or other indication of the last sanitized status of a vehicle, or other information regarding sensor or vehicle status.

The system 100 may use the fleet-facing visualization 136 and/or the information used to generate the same to self-learn one or more routines, with or without human supervision. That is, the system 100 may use one or more of supervised learning, unsupervised learning, and reinforcement learning to self-learn. As an example, the system 100 may self-learn one or more areas of the vehicle 10 to report as needing cleaning more often due to the area being a more popular seating location for passengers within the vehicle 10. As another example, the system 100 may self-learn the average number of passengers that can occupy the vehicle 10 before cleaning is required and may generate information to provide to a user via, for example, the fleet-facing visualization 136 to optimize the number of clean vehicles available for passenger use. In yet another example, the system 100 may learn the average number of users that may use a vehicle 10 before the average user considers the vehicle 10 to be unsanitary.

Still referring to FIG. 3, in some embodiments, the system 100 may be configured to determine a status of the vehicle 10 as sanitized or unsanitized based on the occupancy of the vehicle 10. For example, the system 100 may determine a presence of an occupant for a specified time period (e.g., five minutes) in a first zone (e.g., the back-right seat of FIG. 1) using the plurality of sensors 102, which may be configured to detect the presence or lack of presence of an occupant (e.g., as pressure sensors, thermal sensors, image sensors, etc.). The system 100 may subsequently determine a lack of presence of the occupant for a second specified time period in the first zone (e.g., thirty seconds). The system 100 may then classify the surface 104 around the first zone as unsanitized based on the presence of the occupant for the specified time period and the lack of presence of the occupant for the second specified time period as it may understand that the occupant no longer intends to occupy the vehicle 10.

In some embodiments, the system 100 may log a history of unsanitized zones and generate a recommendation for cleaning one or more zones of the vehicle 10 based on the history of unsanitized zones. For example, the system 100 may record which zones of the vehicle 10 are unsanitized based on occupancy or other parameters detectable by the plurality of sensors 102. The system 100 may generate one or more recommendations to the users of the system 100, which may be delivered using, for example, the remote device 132. The recommendations may regard cleaning the one or more unsanitized zones such that the zone can be relatively free of unsanitary conditions before it is occupied. In some embodiments, the system 100 may record a sanitization time, which may be a time since the vehicle 10 was last sanitized to a particular sanitization level.

Figure 4:
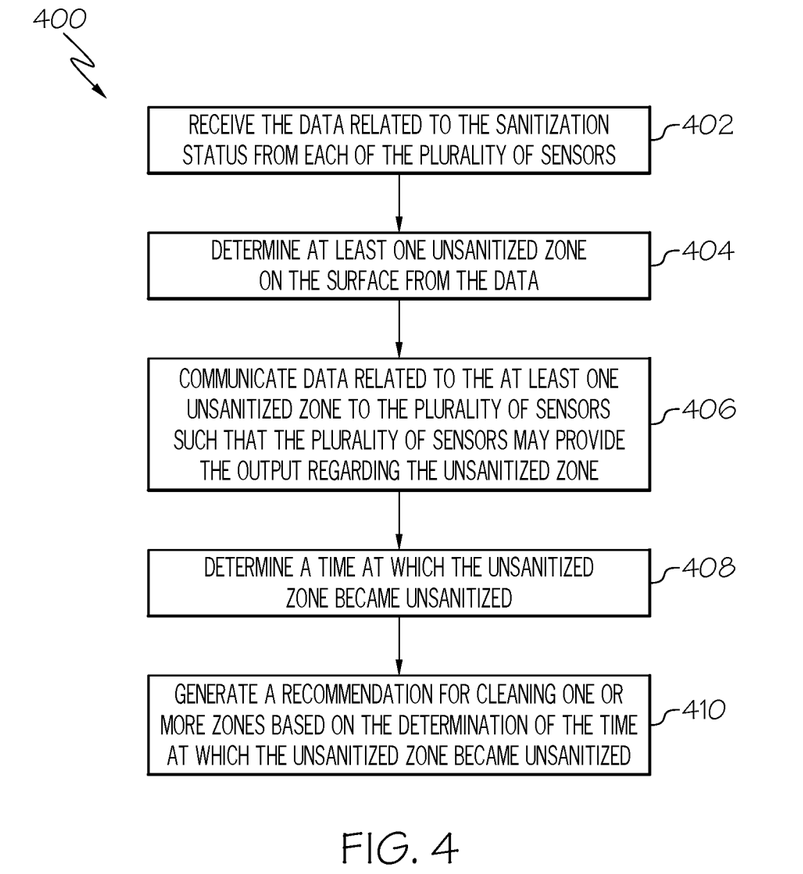
FIG. 4 depicts a flow chart describing a method for determining the sanitization status of an environment that includes a plurality of sensors integrated into a surface of the environment, according to one or more embodiments shown and described herein.

Referring now to FIG. 4, a method 400 for determining the sanitization status of an environment is depicted. The environment may include a plurality of sensors integrated into a surface thereof and each sensor of the plurality of sensors may sense the sanitization status of the surface around the respective sensor, may provide data related to the sanitization status, and may provide output regarding the sanitization status.

At step 402, the method 400 includes receiving the data related to the sanitization status from each of the plurality of sensors. As described above, the plurality of sensors may be, for example, a fuel cell sensor, an infrared (IR) sensor, or other type of sensor capable of detecting a sanitization status of the surface around the sensor and providing feedback regarding the sanitization status. The plurality of sensors may be nodes that are communicatively coupled in a mesh network, sending and receiving information between themselves and a client. The information sent and received between the nodes and the client may related to the cleanliness or the sanitization levels surrounding each of the plurality of sensors, for example. In some embodiments, the sensors may sense the presence of an occupant of the vehicle and the system may make a determination regarding the sanitization status of the area surrounding the sensor based on occupancy.

At step 404, the system may determine at least one unsanitized zone on the surface from the data. For example, with brief reference to FIGS. 1 and 3, the system 100 may determine that the rear seat 105 is unsanitized based on a user having occupied the seat. One or more of the plurality of sensors 102 in and/or around the seat may receive and report data related to an unsanitized status of the area surrounding the respective sensor based on, for example, a detection of contamination or other dirt, debris, bacteria, or other contaminants near the sensor. In some embodiments, the sensor 102 may detect the presence of the occupant for a specified period of time and then detect the lack of presence of the occupant for a specified period of time and the system 100 may use this pattern of occupant presence and lack of presence as an indication of an unsanitized state.

At step 406, the system may communicate data related to the at least one unsanitized zone to the plurality of sensors such that the plurality of sensors may provide the output regarding the unsanitized zone. The data communicated may include, for example, a location of the unsanitized zone, the time the zone became or was classified as unsanitized, the number of surrounding or neighboring zones reporting an unsanitized state, and other data. The unsanitized zone may be, for example, a region within the environment that includes one or more of the plurality of sensors. Because each of the plurality of sensors may be capable of sending and receiving information from the other of the plurality of sensors (e.g., each sensor may be paired with a microcontroller node at the point of deployment), the sensors may each act as small computing platforms that establish routing between and among the various sensor packages in the mesh network. Accordingly, when a remotely located sensor transmits a reading, the data may be related through the intermediate sensors (nodes) until the information reaches the central client (e.g., the controller 120 of FIG. 2). Accordingly, each of the plurality of sensors need only be in communication with at least one other sensor to be a part of the network and if a single sensor fails, the other sensors surrounding it can relay information regarding the sanitization status of the vehicle, making the network more robust.

At step 408, the system may determine a time at which the unsanitized zone became unsanitized. The unsanitized time may be used to determine a time since the zone was last cleaned or may be used to alert a user of the system that a particular zone needs to be cleaned. For example, with brief reference to FIG. 3, the system 100 may report one or more items of information regarding a status of the environment in an informational display 131. The informational display 131 may be displayed, for example, on the remote device 132. The informational display 131 may include information such as, for example, a vehicle identifier, a sensor status (which may include, for example, a number of sensors that are sanitized out of a total number of sensors), a region or zone of the environment that requires sanitization (e.g., the "Target Region"), and an indication of the last time the environment was cleaned (e.g., "Last cleaned: 7 days ago")

At step 410, the system may generate a recommendation for cleaning one or more zones based on the determination of the time at which the unsanitized zone became unsanitized. The recommendation may be displayed, for example, using a heads-up display, a portable device (e.g., the remote device 132 of FIGS. 2 and 3), or other display device. Still referring to FIG. 3, the recommendation may be based, for example, on the amount of time since the environment was last cleaned. As shown in FIG. 3, the Target Region (i.e., the region depicted in FIG. 3) was last cleaned 7 days ago. This report may indicate to a user the last time the region was cleaned and he or she may make a decision to utilize the vehicle, to clean the vehicle, or to take one or more other actions with respect to the vehicle based on such information. Accordingly, this information may help maintain the environment in a clean or sanitized state.

It should now be understood that a system for a system for determining a sanitization status of an environment inside a vehicle may include a plurality of sensors capable of detecting a sanitization state of the area surrounding the sensor and providing data relating to the same. The system may include a plurality of sensors integrated into a surface of the environment (e.g., cabin of the vehicle) such as in a mesh sensor network. Each sensor of the plurality of sensors may sense a sanitization status of the surface around the respective sensor and may provide feedback regarding the sanitization status. The system may further include a computing device that stores logic that, when executed by the computing device causes the computing device to receive data related to the sanitization status from each of the plurality of sensors, determine one or more unsanitized zones on the surface, and communicate data related to the one or more unsanitized zone to the plurality of sensors such that the plurality of sensors may provide the feedback regarding the sanitization status. Such a system can be used to increase the sanitization of one or more vehicles in a fleet of vehicles, thereby enhancing a customer experience when operating one or more vehicles in the fleet.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for determining a sanitization status of an environment comprising:
    a plurality of sensors integrated into a surface of the environment, wherein each sensor of the plurality of sensors senses the sanitization status of the surface around the respective sensor, provides data related to the sanitization status, and provides output regarding the sanitization status; and
    a computing device that stores logic that, when executed by the computing device causes the computing device to perform at least:
        receive the data related to the sanitization status from each of the plurality of sensors;
        determine at least one unsanitized zone on the surface from the data, wherein the at least one unsanitized zone is determined based on a number of the plurality of sensors that are reporting being sanitized or unsanitized;
        determine a time at which the unsanitized zone became unsanitized;
        generate a recommendation for cleaning one or more zones based on the determination of the time at which the unsanitized zone became unsanitized; and
        communicate data related to the at least one unsanitized zone to the plurality of sensors such that the plurality of sensors may provide the output regarding the at least one unsanitized zone.

2. The system of claim 1, wherein the plurality of sensors are coupled into mesh sensor network.

3. The system of claim 2, wherein the mesh sensor network comprises one or more of fuel cell sensors and infrared sensors.

4. The system of claim 1, wherein the computing device further stores logic that, when executed by the computing device causes the computing device to perform at least:
    log a history of unsanitized zones; and
    generate a recommendation for cleaning one or more zones based on the history of unsanitized zones.

5. The system of claim 1, wherein the computing device determines the at least one unsanitized zone by determining a presence of one or more of: bacteria, users, and cleansing solutions.

6. The system of claim 1, wherein the computing device is further configured to report the at least one unsanitized zone to a user.

7. The system of claim 6, further comprising a display, wherein the display is configured to visually depict a location of the at least one unsanitized zone to the user.

8. A method for determining the sanitization status of an environment that includes a plurality of sensors integrated into a surface of the environment, wherein each sensor of the plurality of sensors senses the sanitization status of the surface around the respective sensor, provides data related to the sanitization status, and provides output regarding the sanitization status, the method comprising:
    receiving the data related to the sanitization status from each of the plurality of sensors;
    determining at least one unsanitized zone on the surface from the data, wherein the at least one unsanitized zone is determined based on a number of the plurality of sensors that are reporting being sanitized or unsanitized;
    determine a time at which the unsanitized zone became unsanitized;

generate a recommendation for cleaning one or more zones based on the determination of the time at which the unsanitized zone became unsanitized; and communicating data related to at least one unsanitized zone to the plurality of sensors such that the plurality of sensors may provide the output regarding the at least one unsanitized zone.

9. The method of claim 8 wherein the plurality of sensors are coupled into mesh sensor network.

10. The method of claim 8, further comprising:

determining a time at which the unsanitized zone became unsanitized; and generating a recommendation for cleaning one or more zones based on the determination of the time at which the unsanitized zone became unsanitized.

* * * * *